United States Patent Office

3,215,547
Patented Nov. 2, 1965

3,215,547
HEAT RESISTING MATERIAL AND METHOD FOR MAKING IT
Norman Lawrence Parr, Wareham, Dorset, England, assignor to National Research Development Corporation, London, England, a British corporation
No Drawing. Filed Sept. 20, 1962, Ser. No. 225,120
Claims priority, application Great Britain, Sept. 29, 1961, 35,306/61
7 Claims. (Cl. 106—69)

The present invention relates to an improved heat resisting material capable of withstanding high temperatures and resistant to creep and thermal shock at these temperatures and to a method of producing such material.

In our co-pending patent application Ser. No. 9,416, which relates to a heat resisting material formed of self-bonded silicon nitride, it was described how the nitriding of silicon is brought about by heating the element in an atmosphere of nitrogen for a period of time at temperatures above 1200° C. It was also described how the nitriding time may be reduced by an initial reaction-sintering operation at temperatures between 1250° C. and 1350° C., sufficient to prevent the collapse of the silicon powder into a molten pool when the temperature is raised above the melting point of silicon (1420° C.), the nitriding being completed at a temperature of 1450° C. As an extension of this work experiments have been carried out to produce a material consisting of self-bonded silicon nitride having a dispersion therein of silicon dioxide by a process wherein the silicon powder is partially nitrided by heating the element in an atmosphere of nitrogen or dissociated ammonia, and then completing the process by heating the partially nitrided material in an oxidising atmosphere. These experiments have resulted in a material having good thermal shock properties.

According to the present invention, a shaped body designed to withstand high temperature and to resist creep and thermal shock at such temperature, comprises self-bonded silicon nitride having a dispersion therein of silicon dioxide.

Further, according to the present invention, a method of making a shaped body designed to withstand high temperature and to resist creep and thermal shock at such temperature comprises compacting powdered silicon into the required shape and firing it in an atmosphere of nitrogen so as to effect partial nitriding of the silicon, the firing being completed in an oxidising atmosphere whereby the unreacted silicon or part thereof is converted to silicon dioxide.

The procedure adopted was to halt the nitriding process at an appropriate stage, leaving a prescribed amount of unreacted silicon dispersed throughout the body, this unreacted silicon being converted to silicon dioxide by prolonged heating in an oxidising atmosphere at temperatures about 50° C. above the melting point of silicon (1420° C.). The body thus formed was found to have a "silicon nitride" texture and to contain silicon dioxide, the nature and degree of which depended upon the nitriding schedule adopted to produce the original "silicon nitride" texture. It was found that in the case where the silicon powder had been compacted under a high pressure, the silicon converted to silicon dioxide by the oxidising process was mainly confined to the surface layer. Whilst the physical and mechanical properties of bodies produced according to the present invention have yet to be evaluated, preliminary tests indicate that the material has excellent thermal shock resistance and transverse rupture strength.

As an example of a material prepared according to the present invention, silicon powder was compressed into a block under a pressure of 2 tons per sq. inch. The block was then heated in an atmosphere of nitrogen, initially for a period of 16 hours at a temperature of 1250° C. followed by a period of 4 hours at 1450° C. The nitriding process was then halted and the body was heated in an atmosphere of oxygen for a period of 100 hours at a temperature of 1450° C. The object of the initial heating in an atmosphere of nitrogen is to produce the required texture and proportion of silicon nitride. This can be achieved in a variety of ways, for example, for low and medium density pressings, the block can be heated in an atmosphere of nitrogen for a period of 16 hours at a temperature of 1350° C. Prolonging this stage before going on to the oxidising process will also alter the nature and amount of silicon nitride present in the end product.

The creep strength of the material can be improved by mixing up to 10% by weight of silicon carbide particles finer than 700 B.S. mesh with the silicon powder, the mixture then being isostatically pressed into shape and the reaction process carried out as described above.

Bodies produced in the manner described above are difficult to machine since the material is sufficiently hard to resist machining by orthodox machine tools, though it may be machined by diamond-impregnated grinding tools. A more satisfactory method for producing intricate shapes consists of producing a simple stock pressing of the silicon powder (with or without the addition of silicon carbide) and then sintering it in nitrogen at a temperature of 1125° C. for an hour or so to produce a loosely sintered product. The extent of the reaction-sintering at this stage is a compromise between that required to give the material sufficient mechanical strength to be gripped in a machine, and too much hardness, which would cause gross wear of machine tools.

After this loosely sintered material has been machined to the required finished dimensions, it is replaced in the reaction chamber and the nitriding and oxidising schedules enumerated above are completed. By this method it is possible to produce intricate shapes to close tolerances without involvement in diamond grinding operations.

I claim:
1. A method of making a shaped body designed to withstand high temperature and to resist creep and thermal shock at such temperature comprising the steps of compacting powdered silicon and up to 10% by weight finely divided silicon carbide evenly distributed in the silicon into the required shape, firing the mixture in an atmosphere of nitrogen initially at a temperature below the melting point of silicon for sufficient time to produce a rigid network of silicon nitride retaining the remaining uncombined silicon, firing in nitrogen at a temperature above the melting point of silicon to effect partial nitriding of the remaining uncombined silicon, and then firing in an oxidizing atmosphere to convert the unreacted silicon at least partially to silicon dioxide.

2. The method according to claim 1 wherein the first firing in nitrogen is at a temperature of between 1250 and 1350° C., the second firing in nitrogen and the firing in an oxidizing atmosphere being at a temperature of about 1450° C.

3. The method according to claim 1 wherein the first firing in nitrogen is at a temperature of about 1250° C. for a period of about 16 hours the second firing in nitrogen being at a temperature of about 1450° C. for a period of about 4 hours followed by firing in an oxidizing atmosphere at a temperature of about 1450° C. for a period of about 100 hours.

4. A method of making an intricate shaped body of self-bonded silicon nitride and silicon dioxide designed to withstand high temperatures and to resist creep and thermal shock at such temperature, comprising the steps of compacting powdered silicon into a block, prefiring the block in an atmosphere of nitrogen at a temperature in the region of 1000° C. for a time sufficient to effect such bonding of the silicon that the block can be gripped firmly and machined without producing destruction, machine working the block to the required intricate shape, firing the shaped body in an atmosphere of nitrogen initially at a temperature below the melting point of silicon for sufficient time to produce a rigid network of silicon nitride retaining the uncombined silicon, firing in nitrogen at a temperature above the melting point of silicon to effect partial nitriding of the remaining uncombined silicon, and then firing in an oxidizing atmosphere to convert the unreacted silicon at least partially to silicon dioxide.

5. The method according to claim 4 wherein the prefiring temperature in the region of 1000° C. is a temperature of 1125° C., the initial firing is at a temperature of between 1250 and 1350° C., the second firing and the firing in an oxidizing atmosphere being at a temperature of about 1450° C.

6. A method of making an intricate shaped body of self-bonded silicon nitride and silicon dioxide having a dispersion therein of fine silicon carbide designed to withstand high temperature and to resist creep and thermal shock at such temperature, comprising the steps of compacting powdered silicon and up to 10% by weight finely divided silicon carbide evenly distributed in the silicon into a block, prefiring the block in an atmosphere of nitrogen at a temperature in the region of 1000° C. for a time sufficient to effect such bonding of the silicon that the block can be gripped firmly and machined without producing destruction, working the block to the required finished shape, firing the shaped body in an atmosphere of nitrogen initially at a temperature below the melting point of silicon for sufficient time to produce a rigid network of silicon nitride retaining the uncombined silicon, firing in nitrogen at a temperature above the melting point of silicon to effect partial nitriding of the remaining uncombined silicon, and then firing an oxidizing atmosphere to convert the unreacted silicon at least partially to silicon dioxide.

7. The method according to claim 6 wherein the prefiring temperature in the region of 1000° C. is a temperature of 1125° C., the initial firing is at a temperature of between 1250 and 1350° C., the second firing and the firing in an oxidizing atmosphere being at a temperature of about 1450° C.

References Cited by the Examiner
UNITED STATES PATENTS 2,750,268 6/56 Erasmus et al. _____ 23—191
2,968,530 1/61 Forgeng et al. _____ 106—69

TOBIAS E. LEVOW, *Primary Examiner.*